(12) United States Patent
Uematsu et al.

(10) Patent No.: US 7,405,920 B2
(45) Date of Patent: Jul. 29, 2008

(54) FLAT TYPE CAPACITOR-USE POLYPROPYLENE FILM AND FLAT TYPE CAPACITOR USING IT

(75) Inventors: Kimitake Uematsu, Tsuchiura (JP);
Isamu Moriguchi, Tsuchiura (JP);
Masahito Iwashita, Tsuchiura (JP);
Akira Oda, Tsuchiura (JP)

(73) Assignee: Toray Industries, Inc. (JP)

( * ) Notice: Subject to any disclaimer, the term of this patent is extended or adjusted under 35 U.S.C. 154(b) by 277 days.

(21) Appl. No.: 10/548,820

(22) PCT Filed: Mar. 16, 2004

(86) PCT No.: PCT/JP2004/003473

§ 371 (c)(1),
(2), (4) Date: Sep. 14, 2005

(87) PCT Pub. No.: WO2004/084242

PCT Pub. Date: Sep. 30, 2004

(65) Prior Publication Data

US 2006/0171100 A1    Aug. 3, 2006

(30) Foreign Application Priority Data

Mar. 19, 2003 (JP) .............................. 2003-075843
Jun. 6, 2003 (JP) .............................. 2003-161849

(51) Int. Cl.
*H01G 4/005* (2006.01)

(52) U.S. Cl. .................. 361/303; 361/302; 361/311; 361/313; 361/301.2; 361/322

(58) Field of Classification Search ......... 361/508–509, 361/301.5, 311–313, 511–512, 326–327, 361/302–305, 301.1, 301.2, 301.4, 316–319, 361/322–323

See application file for complete search history.

(56) References Cited

U.S. PATENT DOCUMENTS

| | | | | |
|---|---|---|---|---|
| 5,277,970 A | * | 1/1994 | Schuhmann et al. | 428/323 |
| 5,292,563 A | * | 3/1994 | Peiffer et al. | 428/35.9 |
| 5,719,742 A | * | 2/1998 | Sugisawa | 361/323 |
| 5,724,222 A | * | 3/1998 | Hirano et al. | 361/311 |

(Continued)

FOREIGN PATENT DOCUMENTS

JP    58 16415 A    1/1983

(Continued)

OTHER PUBLICATIONS

Microfilm of the Specification and Drawings annexed to the request of Japanese Utility Model Application No. 134787/1982 (Laid-open No. 39922/1984).

*Primary Examiner*—Nguyen T Ha
(74) *Attorney, Agent, or Firm*—DLA Piper US LLP

(57) ABSTRACT

A flat type capacitor-use polypropylene film having a Δd(thickness determined by micrometer method—thickness determined by weighing method) of 0.05-0.2 μm and a lengthwise shrinkage dimensional change rate of 3% or less, or a flat type capacitor-use polypropylene film having a Δd of 0.1-0.3 μm and a lengthwise F5 value of 50 MPa or more, and a flat type capacitor using it. A film excellent in handling ability in a capacitor element winding process is obtained, and a small, a large-capacity flat type capacitor excellent in withstand voltage characteristics such as self-recovering property, and used suitably under a high rated voltage, is obtained.

6 Claims, 2 Drawing Sheets

U.S. PATENT DOCUMENTS

| | | | |
|---|---|---|---|
| 6,094,337 A * | 7/2000 | Ueda et al. | 361/311 |
| 6,687,115 B2 * | 2/2004 | Carter | 361/323 |
| 6,917,512 B2 * | 7/2005 | Hongu et al. | 361/319 |
| 7,235,618 B2 * | 6/2007 | Lin et al. | 526/348.1 |

FOREIGN PATENT DOCUMENTS

| | | |
|---|---|---|
| JP | 59-39922 | 3/1984 |
| JP | 02 170406 A | 7/1990 |
| JP | 06 338435 A | 12/1994 |
| JP | 09 270361 A | 10/1997 |
| JP | 10 154631 A | 6/1998 |
| JP | 10 156938 A | 6/1998 |
| JP | 11 273990 A | 10/1999 |
| JP | 2000 204177 A | 7/2000 |
| JP | 2001 118430 A | 4/2001 |

* cited by examiner

FLAT TYPE CAPACITOR-USE POLYPROPYLENE FILM AND FLAT TYPE CAPACITOR USING IT

TECHNICAL FIELD

This disclosure relates to a flat type capacitor-use polypropylene film and a flat type capacitor using it, and specifically, to a flat type capacitor having a small size and a large-capacity and use under a high rated voltage, and a polypropylene film for forming the flat type capacitor.

BACKGROUND

A polypropylene film is broadly applied to electric use because it is more excellent in withstand voltage characteristics and electric properties such as dielectric loss than other plastic films. In particular, increase of demand as a dielectric material in the use of capacitors is remarkable. Recently, as various electric devices are made as a inverter formation, and further, as making a capacitor small-sized and large-capacity is accelerated, making a polypropylene film thinner is further required.

However, since a polypropylene film is a material poor in stiffness among plastic films used for capacitors, as its thickness is decreased, requirement of improvement of its handling ability and processing property has been increased. Therefore, various improvements of the handling ability and processing property have been proposed.

For example, a capacitor-use deposited polypropylene film is proposed, wherein a static friction coefficient at 80° C. between a non-deposited surface of a polypropylene film after metal deposition on the other surface of the film and a metal plate plated with chrome is 0.8 or less, and the content of an additive with a melting point of 130° C. or lower is 4,000 ppm by weight or less, and it is known to improve a property for the deposition by it (for example, JP-A-2-170406).

Further, known is a method for carrying out a surface treatment to a non-deposited surface at a wetting tension of 33 dyne/cm or less and giving the film a high-speed winding ability (for example, JP-A-58-16415). Furthermore, a polyester film is proposed wherein its F5 value is 11.0 kgf/mm² or more and the content all particles in the film is in a range of 0.25-0.60 wt %, and it is known to improve the winding property and the slitting property (for example, JP-A-2000-204177).

Further, known is a method for suppressing reduction of withstand voltage and number of insulation defects of a film by controlling a difference Δd between a film thickness determined by micrometer method and a film thickness determined by weighing method in a range of 0.01-0.5 μm (for example, JP-A-10-156938). Furthermore, known is a method for controlling a ratio MMV/WMV of a micrometer thickness (MMV) to weight mean thickness (WMV) in a range of 1.2-1.6, thereby improving flowability between layers of insulation oil at the time of winding a film in an overlapping form (for example, JP-A-2001-118430).

However, in the capacitor-use deposited polypropylene film described in JP-A-2-170406, an effect for suppressing shift of winding in a capacitor element winding process is poor and insufficient. Further, in the method described in JP-A-58-16415, an effect for suppressing generation of wrinkles in a capacitor element winding process is insufficient, and in particular, it is remarkable in a thin film having a thickness of 4 μm or less. Furthermore, because the film described in JP-A-2000-204177 is a polyester film, it is difficult to apply the technology to a polypropylene film from the viewpoint such as a difference between polymer properties.

Further, any proposal is insufficient in withstand voltage characteristic which is one of final targets, especially, in a point for keeping an excellent withstand voltage characteristic for a thin polypropylene film with a thickness of 4 μm or less.

Further, in the method described in JP-A-10-156938, wrinkles generate particularly in a flattening press process of a capacitor element of a thin polypropylene film with a thickness of 4 μm or less, and therefore, it is insufficient in withstand voltage characteristics.

Furthermore, in the method described in JP-A-2001-118430, the porosity between film layers becomes too great, and the withstand voltage characteristics are greatly reduced in a capacitor into which insulation oil is not impregnated.

It could therefore be advantageous to provide a flat type capacitor-use polypropylene film which can suppress generation of shift and wrinkles in a capacitor element winding process or a flattening press process thereafter even if the film is a thin polypropylene film with a thickness of 4 μm or less, which is suitable to make a small-sized flat type capacitor with a large capacity of 500 μF or more for example, which keeps withstand voltage characteristics, in particular, self-recovering property that is one of the characteristics of a flat type capacitor, and which is suitable for use of a direct current rated voltage of 700V or higher, and a flat type capacitor using it.

SUMMARY

We provide a flat type capacitor-use polypropylene film with a Δd, which is a difference between a thickness of the film determined by micrometer method and a thickness of the film determined by weighing method, of 0.05-0.2 μm and a lengthwise shrinkage dimensional change rate of 3% or less.

Another flat type capacitor-use polypropylene film has a Δd, which is a difference between a thickness of the film determined by micrometer method and a thickness of the film determined by weighing method, of 0.1-0.3 μm and a lengthwise F5 value of 50 MPa or more.

We also provide a flat type capacitor-use metallized polypropylene film, wherein a metal is deposited on one or both surfaces of the above-described flat type capacitor-use polypropylene film.

Our flat type capacitors use the above-described flat type capacitor-use polypropylene film as at least a part thereof. Further, our flat type capacitor uses the above-described flat type capacitor-use metallized polypropylene film as at least a part thereof.

EXPLANATION OF LABELS

Figure 1:
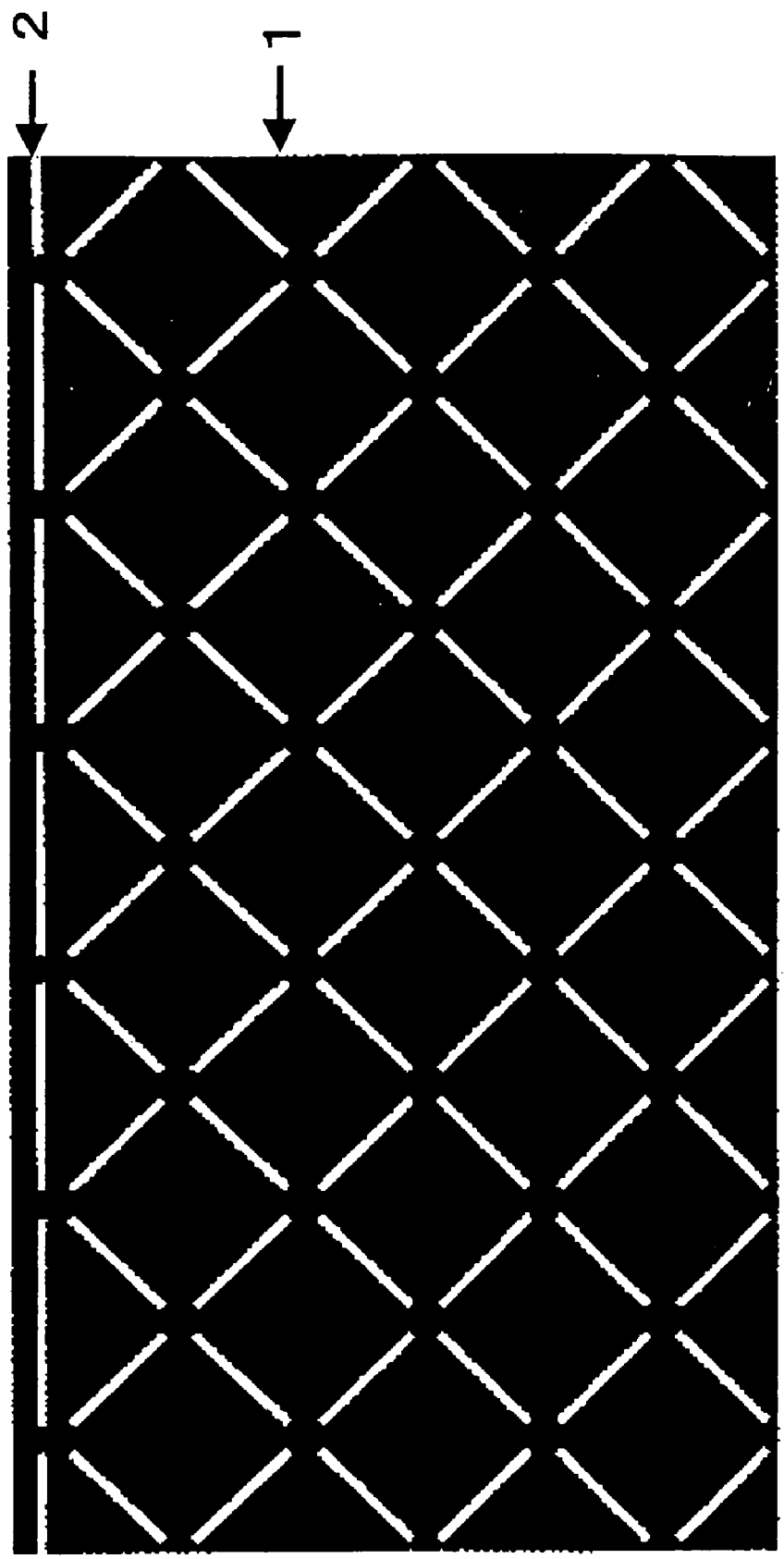
FIG. 1 is a schematic plan view of a flat type capacitor-use metallized polypropylene film, showing an example of a pattern including a margin which is not parallel to the longitudinal direction of the film.

1: metallized portion (black portion)
2: margin portion (white portion)

DETAILED DESCRIPTION

Hereinafter, our films will be explained in detail together with desirable embodiments.

As one aspect of a flat type capacitor-use polypropylene film, it is necessary that the Δd of the film is 0.05 μm or and 0.2 μm or less. The Δd is a value of a difference between a thickness of the film determined by micrometer method (MMV) and a thickness of the film determined by weighing method (WMV), if this value is large, it means that the surface of the film is rough, and the porosity between film layers at the time of being wound at a form of a capacitor element becomes large, and if this value is small, it means that the surface of the film is flat, and the porosity between film layers at the time of being wound at a form of a capacitor element becomes small.

In the flat type capacitor-use polypropylene film, if Δd is less than 0.05 μm, because the film becomes hard to be slipped, there occurs a problem on film processing such as a problem that an effect for suppressing wrinkles cannot be obtained, and further, because the porosity between film layers in the capacitor becomes small, there occurs an inconvenience such as one that gas or scattered metal, generated when a self recovering occurs in the capacitor, is not extracted out of a system and it affects withstand voltage characteristics, and therefore, such a condition is not suitable. If Δd is more than 0.2 μm, there occurs a problem in film processing such as a problem that the film shifts when a capacitor element is wound, and further, from the reason that an inside electric discharge is liable to occur because the porosity between film layers in the capacitor becomes large, there occur inconveniences such as an inconvenience that decrease of capacity accompanying with expiration of time becomes great when an electricity is applied to the capacitor, and an inconvenience that the withstand voltage of the capacitor decreases, and therefore, such a condition is not suitable. Preferably, it is 0.07 μm or more and 0.15 μm or less.

As a method for controlling the Δd of the flat type capacitor-use polypropylene film in the above-described range, for example, can be exemplified a method for controlling a polymer temperature at the time of cooling and solidifying a polymer extruded by an extruder by a cooling roll, a method for selecting a polymer having an appropriate crystallinity, a method for containing a nuclei-generating agent such as polypropylene, etc.

Further, it is necessary that the lengthwise shrinkage dimensional change rate of the flat type capacitor-use polypropylene film according to the present invention is 3% or less. If more than 3%, because the shrinkage of the film in a capacitor manufacturing process such as a heating treatment of a capacitor element becomes large and a distance between film layers becomes small by close contact of the film layers in the capacitor, there occurs an inconvenience such as one that gas or scattered metal generated when a self recovering occurs is not extracted out of a system and it affects withstand voltage characteristics, and therefore, such a condition is not suitable. Further, if the lengthwise shrinkage dimensional change rate of the flat type capacitor-use polypropylene film according to the present invention is too small, because the winding state of a capacitor element may be released by a thermal history in a capacitor manufacturing process or using stage after winding in a form of the capacitor element, thereby changing a porosity between film layers, preferably it is 0.5% or more and 2.8% or less, and more preferably, it is 1.0% or more and 2.5% or less.

Further, it is preferred that the sum of the lengthwise shrinkage dimensional change rate and a widthwise shrinkage dimensional change rate of the flat type capacitor-use polypropylene film according to the present invention is 4% or less, and more preferably, 0.5% or more and 3.5% or less. If within this range, in a processing receiving a thermal stress such as deposition or heat press, a shrinkage of the film can be suppressed and desirable dimensional accuracy and capacity accuracy can be obtained, and therefore, such a condition is preferable.

Further, it is preferred that a ten-point average surface roughness of at least one surface Rz of the flat type capacitor-use polypropylene film is 0.6 μm or less. If the Rz of a surface aiming metal deposition is more than 0.6 μm, because a large irregularity is formed on the metal deposited surface, which functions as an electrode of a capacitor, and a concentration of an electric field is caused, it may reduce withstand voltage characteristics, and therefore, it is preferred that the Rz of a surface aiming metal deposition is 0.6 μm or less. More preferably, it is 0.5 μm or less. Although the lower limit of Rz is not particularly restricted to properly maintain the slipping property of the film, it is preferably 0.1 μm or more.

Further, in the flat type capacitor-use polypropylene film, to prevent the film from becoming hard to slip by reduction of stiffness as the thickness becomes thinner, it is preferred that the film contains polymethylpentene at a content of 0.5 wt % to 5 wt %, from an effect for giving a slipping property and an economic point, and a more preferable content is within a range of 0.7 wt % to 4 wt %.

Although the thickness of the polypropylene film is not particularly limited, because a thin film poor in stiffness has a tendency to generate wrinkles, our films are particularly effective in and suitable to a film whose thickness determined by micrometer method is 4 μm or less.

The polymer forming the flat type capacitor-use polypropylene film is not particularly limited, and except a homopolymer of polypropylene, it may be a copolymer of propylene and another α-olefin (for example, ethylene, butene, etc.) and further, may be a blend of polypropylene and another α-olefin polymer (for example, polyethylene, polybutene, etc.).

Further, although the flat type capacitor-use polypropylene film may be prepared by any of a tenter method and an inflation method and the stretching method also is not particularly limited, a biaxially stretching by a tenter method is preferred from the viewpoint of requirement of a thin film with a small irregularity in thickness.

Further, additives contained in the flat type capacitor-use polypropylene film are not particularly limited, and may be appropriately selected and contained within a range in which the properties of the capacitor are not affected.

The electrode, when the flat type capacitor-use polypropylene film is used for a capacitor, is not particularly limited, and although it may be a metal foil, or may be a paper or plastic film both surfaces of which are metallized, or one or both surfaces of the polypropylene film may be directly metallized, the direct film metallization is particularly preferable for the use of capacitor requiring small size and light weight. In this case, although a single metal such as zinc, tin, silver, chrome, aluminium, copper, nickel, etc. or a mixture or an alloy of a plurality of metals can be raised as a kind of the used metal, it is not particularly limited.

Figure 2:
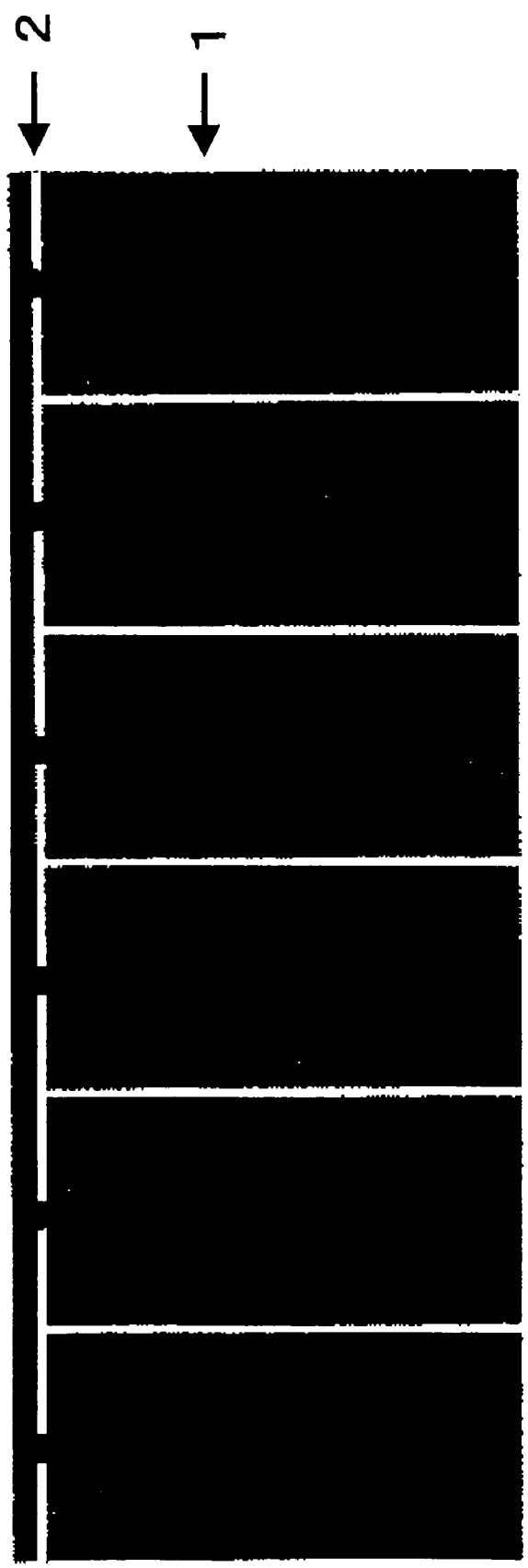
FIG. 2 is a schematic plan view of a flat type capacitor-use metallized polypropylene film, showing another example of a pattern including a margin which is not parallel to the longitudinal direction of the film.

Further, as a method for directly metallizing a film, vacuum deposition method, spattering, etc. can be exemplified, and although it is not particularly restricted, vacuum deposition method is more preferable from the viewpoints of its productivity and economic property. Although a crucible system or wire system can be raised generally as the vacuum deposition method, it is not particularly limited, and it may be appropriately selected. The margin pattern in a case of metallization by deposition also is not particularly limited, and it may be either a usual pattern or a special margin pattern applied for the purpose of improvement of safety property of a capacitor. However, because a metal surface and a film surface alternately come into contact with various kinds of rolls when the film is run, the friction condition with each roll is not stabilized and inconveniences such as wrinkles are liable to occur, in particular, systems as exemplified in FIGS. 1 and 2 are suitable wherein the systems include a margin portion 2 which is not parallel to a metallized portion I in the longitudinal direction of the film, because such inconveniences can be reduced. The system for forming these margins is not particularly limited, and for example, it may be a tape system, or may be an oil system.

Further, the capacitor formed from the polypropylene film is used mainly as a flat type capacitor formed through a flattening press process in which wrinkles are liable to occur.

Next, an example of a method for manufacturing the above-described polypropylene film will be shown, but not limited thereto.

Polypropylene resin added with tetrakis[methylene-3(3,5-di-tertiarybutyl-4-hydroxyphenyl)propionate]methane at a content of 0.01-0.8 wt %, having a melt index of 3.0-4.5 g/10 min., is supplied to an extruder at a temperature of 240-270° C. and molten, and delivered out from a T die having a slit in a form of a sheet, and cooled and solidified by a cooling roll at a temperature of 75-95° C. At that time, the higher the melt index of the polypropylene resin is, the smaller the shrinkage dimensional change rate becomes, and the less the ash content is and the higher the mesopentad fraction is, the dielectric break-down voltage increases, and therefore, these may be appropriately selected. Further, generally, the higher the temperature of the cooling roll is, the greater the surface roughness becomes, and therefore, in order to obtain a desirable $\Delta d$, the temperature of the cooling roll may be appropriately selected, and the temperature is preferably 80 to 90° C.

Next, the film is stretched by stretching rolls with a temperature of 135-155° C. in the longitudinal direction at a draw ratio of 3-7 times. Also in this step, the degree of the surface roughness can be changed by appropriately selecting the stretching temperature. Then, the film is stretched in the transverse direction at a temperature of 155-170° C. and a draw ratio of 7-12 times, and further, heat treated at a temperature of 150-165° C. Generally, the lower the stretching temperature or the heat treatment temperature is and the higher the draw ratio is, the larger shrinkage dimensional change rate becomes, and therefore, these conditions may be appropriately selected. After corona discharge treatment is applied to one surface of the polypropylene film thus prepared, the film is wound by a winder.

Next, as another embodiment of the flat type capacitor-use polypropylene film, it is necessary that $\Delta d$ of the film is 0.1-0.3 µm. Similarly to that aforementioned, the $\Delta d$ is a value of a difference between a thickness of the film determined by micrometer method and a thickness of the film determined by weighing method, if this value is large, it means that the surface of the film is rough, and the porosity between film layers at the time of being wound at a form of a capacitor element becomes large, and if this value is small, it means that the surface of the film is flat, and the porosity between film layers at the time of being wound at a form of a capacitor element becomes small.

In the above-described flat type capacitor-use polypropylene film, if $\Delta d$ is less than 0.1 µm, because the film becomes hard to be slipped, there occurs a problem on film processing such as a problem that an effect for suppressing wrinkles cannot be obtained, and further, because the porosity between film layers in the capacitor becomes small, there occurs an inconvenience such as one that gas or scattered metal, generated when a self recovering occurs in the capacitor, is not extracted out of a system and it affects withstand voltage characteristics, and therefore, such a condition is not suitable. If $\Delta d$ is more than 0.3 µm, there occurs a problem in film processing such as a problem that the film shifts when a capacitor element is wound, and further, from the reason that an inside electric discharge is liable to occur because the porosity between film layers in the capacitor becomes large, there occur inconveniences such as an inconvenience that decrease of capacity accompanying with expiration of time becomes great when an electricity is applied to the capacitor, and an inconvenience that the withstand voltage of the capacitor decreases, and therefore, such a condition is not suitable. Preferably, it is in a range of 0.15-0.25 µm.

As a method for controlling the $\Delta d$ of the above-described flat type capacitor-use polypropylene film according to the present invention in the above-described range, for example, can be exemplified a method for controlling a polymer temperature at the time of cooling and solidifying a polymer extruded by an extruder by a cooling roll, a method for selecting a polymer having an appropriate crystallinity, a method for containing a nuclei-generating agent such as β-cristalline structure nuclei agent, etc.

Further, in the above-described flat type capacitor-use polypropylene film, it is necessary that F5 value in the longitudinal direction, namely, a stress required for elongating the film by 5%, is 50 MPa or more. If less than 50 MPa, there occur inconveniences such as an inconvenience that breakage frequently occurs at the time of film processing and an inconvenience that a winding defect such as generation of wrinkles occurs at the time of winding the film in a form of a capacitor element, and further, there occurs an inconvenience that the withstand voltage characteristics may be affected by the wrinkles at the time of winding, air involved, etc., and therefore, such a condition is not suitable. It is preferably 55 MPa or more.

Further, it is preferred that a ten-point average surface roughness of at least one surface Rz of the above-described flat type capacitor-use polypropylene film according to the present invention is in a range of 0.7-1.4 µm. If the Rz is less than 0.7 µm, even if the $\Delta d$ of the film is satisfied, extraction of gas or scattered metal, generated when a self recovering occurs in the capacitor, may become insufficient and the withstand voltage characteristics may reduce, and therefore, the Rz is preferably 0.7 µm or more, more preferably 0.9 µm or more. If the Rz of a surface aiming metal deposition is more than 1.4 µm, because a large irregularity is formed on the metal deposited surface, which functions as an electrode of a capacitor, and a concentration of an electric field is caused, it may reduce withstand voltage characteristics, and therefore, it is preferred that the Rz of a surface aiming metal deposition is 1.4 µm or less. More preferably, it is 1.2 µm or less.

Although the thickness of the above-described flat type capacitor-use polypropylene film is not particularly limited, because a thin film poor in stiffness has a tendency to generate wrinkles or a film breakage, the present invention is particularly effective in and suitable to a film whose thickness determined by micrometer method is 4 µm or less, preferably 3.5 µm or less.

The polymer forming the above-described flat type capacitor-use polypropylene film is not particularly limited, and except a homopolymer of polypropylene, it may be a copolymer of propylene and another α-olefin (for example, ethylene, butene, etc.) and further, may be a blend of polypropylene and another α-olefin polymer (for example, polyethylene, polybutene, etc.), but a homopolymer having a melting point of 164° C. or higher is preferred from the viewpoint of increase of withstand voltage characteristics, and more preferably the melting point is 165° C. or higher. Further, because the melting point is higher than 167° C., because the property for film formation remarkably deteriorates, the melting point is preferably 167° C. or lower.

Furthermore, although the above-described flat type capacitor-use polypropylene film may be prepared by any of a tenter method and an inflation method and the stretching method also is not particularly limited, a biaxially stretching by a tenter method is preferred from the viewpoint of requirement of a thin film with a small irregularity in thickness.

Further, additives contained in the above-described flat type capacitor-use polypropylene film are not particularly limited, and may be appropriately selected and contained within a range in which the properties of the capacitor are not affected.

The electrode, when the above-described flat type capacitor-use polypropylene film is used for a capacitor, is not particularly limited, and although it may be a metal foil, or may be a paper or plastic film both surfaces of which are metallized, or one or both surfaces of the polypropylene film may be directly metallized, the direct film metallization is particular preferable for the use of capacitor requiring small size and light weight. In this case, although a single metal such as zinc, tin, silver, chrome, aluminium, copper, nickel, etc. or a mixture or an alloy of a plurality of metals can be raised as a kind of the used metal, it is not particularly limited.

Further, as a method for directly metallizing a film, vacuum deposition method, spattering, etc. can be exemplified, and although it is not particularly restricted, vacuum deposition method is more preferable from the viewpoints of its productivity and economic property. Although a crucible system or wire system can be raised generally as the vacuum deposition method, it is not particularly limited, and it may be appropriately selected, but EB gun system, whose rate for giving defects is small, is more preferable. The margin pattern in a case of metallization by deposition also is not particularly limited, and it may be either a usual pattern or a special margin pattern applied for the purpose of improvement of safety property of a capacitor. However, similarly to that aforementioned, because a metal surface and a film surface alternately come into contact with various kinds of rolls when the film is run, the friction condition with each roll is not stabilized and inconveniences such as wrinkles are liable to occur, in particular, systems as exemplified in FIGS. 1 and 2 are suitable wherein the systems include a margin portion 2 which is not parallel to a metallized portion 1 in the longitudinal direction of the film, because such inconveniences can be reduced. The system for forming these margins is not particularly limited, and for example, it may be a tape system, or may be an oil system.

Further, the capacitor formed from the flat type capacitor-use polypropylene film is used mainly as a flat type capacitor formed through a flattening press process in which wrinkles are liable to occur.

Next, an example of a method for manufacturing the above-described flat type capacitor-use polypropylene film will be shown, but not limited thereto.

Polypropylene resin added with tetrakis[methylene-3(3,5-di-tertiarybutyl-4-hydroxyphenyl)propionate]methane at a content of 0.01-0.8 wt %, having a melt index of 3.0-4.5 g/10 min., is supplied to an extruder at a temperature of 230-270° C. and molten, and delivered out from a T die having a slit in a form of a sheet, and cooled and solidified by a cooling roll at a temperature of 75-95° C. At that time, the lower the melt index of the polypropylene resin is, the larger the F5 value becomes, and the less the ash content is, the dielectric breakdown voltage increases, and therefore, these may be appropriately selected. Further, generally, the higher the temperature of the cooling roll is, the greater the surface roughness becomes, and therefore, in order to obtain a desirable Δd, the temperature of the cooling roll may be appropriately selected, and the temperature is preferably 80 to 95° C.

Next, the film is stretched by stretching rolls with a temperature of 135-155° C. in the longitudinal direction at a draw ratio of 3-7 times. Also in this step, the degree of the surface roughness can be changed by appropriately selecting the stretching temperature. Then, the film is stretched in the transverse direction at a temperature of 155-170° C. and a draw ratio of 7-12 times, and further, heat treated at a temperature of 150-165° C. Generally, the lower the stretching temperature or the heat treatment temperature is and the higher the draw ratio is, the larger f5 value becomes, and therefore, these conditions may be appropriately selected. After corona discharge treatment is applied to one surface of the flat type capacitor-use polypropylene film thus prepared, the film is wound by a winder.

EXAMPLES

Next, methods for determination and evaluation will be explained.

(1) Melting Point:

Using a differential scanning calorimeter DSC-7 produced by Perkin Elmer Corporation, the melting point was determined under the following conditions.

Preparation of Sample:

A sample of 10 mg is measured on an aluminum pan for determination, and the aluminum pan is sandwiched by a crimper attached to the device.

Condition of Determination:
  1st run: The temperature is elevated up to 280° C. at a rate of 10° C./min., and the elevated temperature is kept for 5 minutes. Thereafter, the temperature is lowered down to 125° C. at a rate of 50° C./min., and after the lowered temperature is kept for 60 minutes, the temperature is lowered down to 25° C. at the same rate and the the lowered temperature is kept for 10 minutes.
  2nd run: Immediately after carrying out the 1st run, successively the temperature is elevated up to 280° C. at a rate of 10° C./min.

A fusion peak value at the time of the 2nd run is read as a melting point. In a case where there are a plurality of fusion peak values, a fusion peak value having a largest peak area is employed.

The above-described measurement was repeated five times, and among these, an average value of 3 points omitting 2 points of maximum and minimum values was determined as the melting point.

(2) Melt Index:

It was determined by the condition of JIS K 7210.

(3) Δd:

A thickness determined by the micrometer method (hereinafter, referred to as "MMV") was measured by JIS C-2330 (2001), 7.4.1.1. After a thickness determined by the weighing method (hereinafter, referred to as "WMV") was measured by JIS C-2330 (2001), 7.4.1.2, the Δd was determined by the following equation.

$$\Delta d(\mu m) = MMV - WMV$$

(4) Shrinkage Dimensional Change Rate:

It was determined by JIS C-2330 (2001), 7.4.1.1 B method.

(5) Ten-Point Average Roughness (Rz):

It was determined by JIS B-0601 (1982), using a non-contact three-dimentional fine shape measurement device (ET-30HK) and a three-dimensional roughness analysis device (MODEL SPA-11) which were produced by Kosaka Kenkyusho Corporation. The average value of three measurement times was used. The detailed conditions are as follows.

Treatment of measurement surface: Aluminium was vacuum deposited on a measurement surface, and non-contact method was employed.

Length of measurement: 1 mm

Lateral magnification: 200 times

Axial magnification: 20,000 times

Cut off: 0.25 mm

Feed speed in a transverse direction: 0.1 mm/sec.

Feed pitch in a longitudinal direction: 10 μm

Feed times in a longitudinal direction: 20 times

Measurement direction: transverse direction of film (6) Generation Rate of Wrinkle and Generation Rate of Shift:

Using a vacuum deposition apparatus produced by ULVAC Corporation, by depositing aluminium onto a polypropylene film at a condition of a membrane resistance of 5 Ω/□ and a condition where T-type margin is not provided, a usual margin metallized film was prepared, and winding similar to a manufacturing process of a usual capacitor was carried out with a combination of the usual margin films, or a T-type margin metallized film shown in FIG. 2 with a membrane resistance of 15 Ω/□ was prepared, and winding similar to a manufacturing process of a usual capacitor was carried out with a combination of the film and a usual margin film not provided with T-type margin, and by the winding, 100 capacitor elements with a capacity of 100 μF were made, and the generation rates of wrinkle and shift were determined. In this determination, main winding conditions are as follows.

Winder: KAW-4L produced by Kaido Seisakusho Corporation

Winding speed: 2,000 rpm

Tension: 600g

5% or less in generation rate of wrinkle and 5% or less in generation rate of shift relative to 100 capacitor elements made were determined to be acceptable.

(7) Withstand Voltage:

10 capacitor elements were picked out from the capacitor elements obtained in the above-described (6), after they were heat treated for 6 hours at a temperature of 11° C. and at a condition of being flattened with a pressure of 0.4 MPa, self-recovering test was carried out based on JIS C-4908 (1985) 8.14, the withstand voltage was determined from the average value of the number of self recovered capacitors and the number of broken capacitors.

7 or less in number of self recovered capacitors and 3 or less in number of broken capacitors were determined to be acceptable.

(8) F5 Value:

Determination was carried out by JIS C-2330 (2001) 7.4.5, and a stress when a sample was elongates by 5% was calculated.

(9) Withstand Voltage (Breakage Number of Elements, Average Applied Voltage):

10 capacitor elements were picked out from the capacitor elements obtained in the above-described (6), after they were heat treated for 6 hours at a temperature of 11° C. and at a condition of being flattened with a pressure of 0.4 MPa, metallikon and lead terminal providing were carried out. This element was armored with an epoxy resin to make a capacitor with a capacity of 100 μF, a voltage of DC 1,000V was applied to the capacitor under an atmosphere of 105° C. to investigate breakage of element and change of capacity, and an application time expired to reach 50% of capacity change rate and a number of broken elements were determined by the following standards.

2 or less in number of broken elements was determined to be acceptable.

100 hours or more in the average value of application times (removing elements broken on the way) was determined to be acceptable.

Next, the films and capacitors will be explained based on examples.

Example 1

Polypropylene resin added with tetrakis[methylene-3(3,5-di-tertiarybutyl-4-hydroxyphenyl)propionate]methane at a content of 0.3 wt %, having a melt index of 3.5 g/10 min., was supplied to an extruder at a temperature of 250° C. and molten, and delivered out from a T die having a slit in a form of a sheet, and cooled and solidified by a cooling roll at a temperature of 85° C., and thereafter, the sheet was stretched in the longitudinal direction at a temperature of 140° C. and a draw ratio of 5 times, and then stretched in the transverse direction at a temperature of 167° C. and a draw ratio of 10 times, and then heat treated at a temperature of 165° C. Thereafter, a corona discharge treatment was applied to one surface of the film so that the wet tension became 42 mN/m, and after the film was wound by a winder, the film was slit at a width of 620 mm and a length of 40,000 m and wound up.

At that time, the MMV of the film was 3 μm, the Δd was 0.10 μm, the ten-point average roughness Rz of the surface applied with the corona discharge treatment was 0.4 μm, the ten-point average roughness Rz of the opposite surface was 0.7 μm, the lengthwise shrinkage dimensional change rate was 2.7%, and the widthwise shrinkage dimensional change rate was 0.3%.

This film was deposited with aluminium on its one surface by a capacitor-use vacuum deposition device so that the membrane resistance became 5 Ω/□, and thereafter, it was slit at a width of 100 mm and a length of 4,800 m to prepare 48 reels.

Using these reels, 100 capacitor elements were made, and the generation rates of wrinkle and shift were investigated. The generation rate of wrinkle was 2%, and the generation rate of shift was 0%.

Further, the number of self recovering was 2, and the number of breakage was 0.

Example 2

A polypropylene film was prepared at the same conditions as those of Example 1 other than a condition of using a polymer added with polymethylpentene at a content of 2.0 wt %.

At that time, the MMV of the film was 3 μm, the Δd was 0.11 μm, the ten-point average roughness Rz of the surface applied with the corona discharge treatment was 0.4 μm, the ten-point average roughness Rz of the opposite surface was 0.7 μm, the lengthwise shrinkage dimensional change rate was 2.6%, and the widthwise shrinkage dimensional change rate was 0.2%.

This film was deposited with aluminium on its one surface by a capacitor-use vacuum deposition device so that the membrane resistance became 5 Ω/□, and thereafter, it was slit at a width of 100 mm and a length of 4,800 m to prepare 48 reels.

Using these reels, 100 capacitor elements were made, and the generation rates of wrinkle and shift were investigated. The generation rate of wrinkle was 0%, and the generation rate of shift was 0%.

Further, the number of self recovering was 2, and the number of breakage was 0.

Example 3

A polypropylene film was prepared at the same conditions as those of Example 1other than a condition of supplying a polypropylene resin with a melt index of 3.9 g/10 min. to an extruder with a temperature of 250° C., melting it, and delivering it out from a T die with a slit in a form of a sheet.

At that time, the MMV of the film was 3 μm, the Δd was 0.13 μm, the ten-point average roughness Rz of the surface applied with the corona discharge treatment was 0.5 μm, the ten-point average roughness Rz of the opposite surface was 0.8 μm, the lengthwise shrinkage dimensional change rate was 2.5%, and the widthwise shrinkage dimensional change rate was 0%.

This film was deposited with aluminium on its one surface by a capacitor-use vacuum deposition device so that the membrane resistance became 5 Ω/□, and thereafter, it was slit at a width of 100 mm and a length of 4,800 m to prepare 48 reels.

Using these reels, 100 capacitor elements were made, and the generation rates of wrinkle and shift were investigated. The generation rate of wrinkle was 0%, and the generation rate of shift was 3%.

Further, the number of self recovering was 5, and the number of breakage was 1.

Example 4

A polypropylene film was prepared at the same conditions as those of Example 1 other than a condition of cooling and solidifying a sheet delivered out from a T die with a slit by a cooling roll with a temperature of 80° C.

At that time, the MMV of the film was 3 μm, the Δd was 0.06 μm, the ten-point average roughness Rz of the surface applied with the corona discharge treatment was 0.2 μm, the ten-point average roughness Rz of the opposite surface was 0.3 μm, the lengthwise shrinkage dimensional change rate was 2.9%, and the widthwise shrinkage dimensional change rate was 0.5%.

This film was deposited with aluminium on its one surface by a capacitor-use vacuum deposition device so that the membrane resistance became 5 Ω/□, and thereafter, it was slit at a width of 100 mm and a length of 4,800 m to prepare 48 reels.

Using these reels, 100 capacitor elements were made, and the generation rates of wrinkle and shift were investigated. The generation rate of wrinkle was 2%, and the generation rate of shift was 4%.

Further, the number of self recovering was 2, and the number of breakage was 3.

Example 5

A polypropylene film was prepared at the same conditions as those of Example 1 other than a condition of cooling and solidifying a sheet delivered out from a T die with a slit by a cooling roll with a temperature of 90° C.

At that time, the MMV of the film was 3 μm, the Δd was 0.18 μm, the ten-point average roughness Rz of the surface applied with the corona discharge treatment was 0.6 μm, the ten-point average roughness Rz of the opposite surface was 0.9 μm, the lengthwise shrinkage dimensional change rate was 2.7%, and the widthwise shrinkage dimensional change rate was 0.1%.

This film was deposited with aluminium on its one surface by a capacitor-use vacuum deposition device so that the membrane resistance became 5 Ω/□, and thereafter, it was slit at a width of 100 mm and a length of 4,800 m to prepare 48 reels.

Using these reels, 100 capacitor elements were made, and the generation rates of wrinkle and shift were investigated. The generation rate of wrinkle was 0%, and the generation rate of shift was 4%.

Further, the number of self recovering was 4, and the number of breakage was 2.

Example 6

A polypropylene film was prepared at the same conditions as those of Example 1 other than a condition of stretching the film in the longitudinal direction at a temperature of 140° C. and a draw ratio of 5 times, and then stretching the film in the transverse direction at a temperature of 158° C. and a draw ratio of 10 times, and then heat treating it at a temperature of 160° C.

At that time, the MMV of the film was 3 μm, the Δd was 0.09 μm, the ten-point average roughness Rz of the surface applied with the corona discharge treatment was 0.4 μm, the ten-point average roughness Rz of the opposite surface was 0.6 μm, the lengthwise shrinkage dimensional change rate was 3.0%, and the widthwise shrinkage dimensional change rate was 0.7%.

This film was deposited with aluminium on its one surface by a capacitor-use vacuum deposition device so that the membrane resistance became 5 Ω/□, and thereafter, it was slit at a width of 100 mm and a length of 4,800 m to prepare 48 reels.

Using these reels, 100 capacitor elements were made, and the generation rates of wrinkle and shift were investigated. The generation rate of wrinkle was 0%, and the generation rate of shift was 0%.

Further, the number of self recovering was 3, and the number of breakage was 3.

Comparative Example 1

A polypropylene film was prepared at the same conditions as those of Example 1 other than a condition of cooling and solidifying a sheet delivered out from a T die with a slit by a cooling roll with a temperature of 70° C.

At that time, the MMV of the film was 3 μm, the Δd was 0.03 μm, the ten-point average roughness Rz of the surface applied with the corona discharge treatment was 0.2 μm, the ten-point average roughness Rz of the opposite surface was 0.3 μm, the lengthwise shrinkage dimensional change rate was 2.8%, and the widthwise shrinkage dimensional change rate was 0.3%.

This film was deposited with aluminium on its one surface by a capacitor-use vacuum deposition device so that the membrane resistance became 5 Ω/□, and thereafter, it was slit at a width of 100 mm and a length of 4,800 m to prepare 48 reels.

Using these reels, 100 capacitor elements were made, and the generation rates of wrinkle and shift were investigated. The generation rate of wrinkle was 8%, and the generation rate of shift was 10%.

Further, the number of self recovering was 7, and the number of breakage was 8.

Comparative Example 2

A polypropylene film was prepared at the same conditions as those of Example 1 other than a condition of cooling and solidifying a sheet delivered out from a T die with a slit by a cooling roll with a temperature of 96° C.

At that time, the MMV of the film was 3 μm, the Δd was 0.21 μm, the ten-point average roughness Rz of the surface applied with the corona discharge treatment was 0.7 μm, the ten-point average roughness Rz of the opposite surface was 1.2 μm, the lengthwise shrinkage dimensional change rate was 2.5%, and the widthwise shrinkage dimensional change rate was 0.1%.

This film was deposited with aluminium on its one surface by a capacitor-use vacuum deposition device so that the membrane resistance became 5 Ω/□, and thereafter, it was slit at a width of 100 mm and a length of 4,800 m to prepare 48 reels.

Using these reels, 100 capacitor elements were made, and the generation rates of wrinkle and shift were investigated. The generation rate of wrinkle was 0%, and the generation rate of shift was 6%.

Further, the number of self recovering was 9, and the number of breakage was 6.

Comparative Example 3

A polypropylene film was prepared at the same conditions as those of Example 1 other than a condition of supplying a polypropylene resin with a melt index of 2.8 g/10 min. to an extruder with a temperature of 250° C., melting it, and delivering it out from a T die with a slit in a form of a sheet.

At that time, the MMV of the film was 3 μm, the Δd was 0.09 μm, the ten-point average roughness Rz of the surface applied with the corona discharge treatment was 0.4 μm, the ten-point average roughness Rz of the opposite surface was 0.6 μm, the lengthwise shrinkage dimensional change rate was 3.4%, and the widthwise shrinkage dimensional change rate was 0.8%.

This film was deposited with aluminium on its one surface by a capacitor-use vacuum deposition device so that the membrane resistance became 5 Ω/□, and thereafter, it was slit at a width of 100 mm and a length of 4,800 m to prepare 48 reels.

Using these reels, 100 capacitor elements were made, and the generation rates of wrinkle and shift were investigated. The generation rate of wrinkle was 0%, and the generation rate of shift was 0%.

Further, the number of self recovering was 5, and the number of breakage was 6.

Example 7

Polypropylene resin added with tetrakis[methylene-3(3,5-di-tertiarybutyl-4-hydroxyphenyl)propionate]methane ("Irganox" 1010 produced by Chiba·Speciality·Chemical Corporation) at a content of 0.3 wt %, having a melt index of 3.7 g/10 min. and a melting point of 166° C., was supplied to an extruder at a temperature of 240° C. and molten, and delivered out from a T die having a slit in a form of a sheet, and cooled and solidified by a cooling roll at a temperature of 90° C., and thereafter, the sheet was stretched in the longitudinal direction at a temperature of 140° C. and a draw ratio of 5 times, and then stretched in the transverse direction at a temperature of 162° C. and a draw ratio of 10 times, and then heat treated at a temperature of 150° C. Thereafter, a corona discharge treatment was applied to one surface of the film so that the wet tension became 42 mN/m, and after the film with a width of 50,000 mm was wound by a winder, and then, the film was further slit at a width of 620 mm and a length of 40,000 m and wound up.

At that time, the MMV of the film was 3.3 μm, the Δd was 0.20 μm, the ten-point average roughness Rz of the surface applied with the corona discharge treatment was 1.0 μm, the ten-point average roughness Rz of the opposite surface was 1.1 μm, and the lengthwise F5 value was 52 MPa.

This film was deposited with aluminium on its one surface by a capacitor-use vacuum deposition device at the T-type pattern shown in FIG. 2 so that the membrane resistance became 15 Ω/□, and thereafter, it was slit at a width of 100 mm and a length of 4,800 m to prepare 48 reels. The width of the lengthwise margin portion was 0.7 mm, and margins each having a width of 0.4 mm were provided in the transverse direction at an interval of 16 mm. Further, a usual margin product was prepared in a similar manner. Combining these T-type margin product and usual margin product, 100 capacitor elements were made, and the generation rates of wrinkle and shift were investigated. The generation rate of wrinkle was 2%, and the generation rate of shift was 1%.

Further, by the time reaching 50% in capacity change rate, the number of elements broken was 0, and the application time was 173 hours.

Example 8

A polypropylene film was prepared at the same conditions as those of Example 7 other than a condition of supplying a polypropylene resin with a melt index of 3.2 g/10 min. and a melting point of 166° C. to an extruder with a temperature of 250° C., melting it, and delivering it out from a T die with a slit in a form of a sheet.

At that time, the MMV of the film was 3.2 μm, the Δd was 0.19 μm, the ten-point average roughness Rz of the surface applied with the corona discharge treatment was 1.0 μm, the ten-point average roughness Rz of the opposite surface was 1.0 μm, and the lengthwise F5 value was 57 MPa.

This film was deposited at the same condition as that in Example 7, and thereafter, it was slit at a width of 100 mm and a length of 4,800 m to prepare 48 reels.

Combining this T-type margin product and a usual margin product, 100 capacitor elements were made, and the generation rates of wrinkle and shift were investigated. The generation rate of wrinkle was 0%, and the generation rate of shift was 0%.

Further, by the time reaching 50% in capacity change rate, the number of elements broken was 0, and the application time was 212 hours.

Example 9

A polypropylene film was prepared at the same conditions as those of Example 7 other than a condition of cooling and solidifying a sheet delivered out from a T die with a slit by a cooling roll with a temperature of 87° C.

At that time, the MMV of the film was 3.2 μm, the Δd was 0.12 μm, the ten-point average roughness Rz of the surface applied with the corona discharge treatment was 0.8 μm, the ten-point average roughness Rz of the opposite surface was 0.9 μm, and the lengthwise F5 value was 53 MPa.

This film was deposited at the same condition as that in Example 7, and thereafter, it was slit at a width of 100 mm and a length of 4,800 m to prepare 48 reels.

Combining this T-type margin product and a usual margin product, 100 capacitor elements were made, and the generation rates of wrinkle and shift were investigated. The generation rate of wrinkle was 4%, and the generation rate of shift was 0%.

Further, by the time reaching 50% in capacity change rate, the number of elements broken was 2, and the application time was 235 hours.

Example 10

A polypropylene film was prepared at the same conditions as those of Example 7 other than a condition of cooling and solidifying a sheet delivered out from a T die with a slit by a cooling roll with a temperature of 93° C.

At that time, the MMV of the film was 3.3 µm, the Δd was 0.27 µm, the ten-point average roughness Rz of the surface applied with the corona discharge treatment was 1.2 µm, the ten-point average roughness Rz of the opposite surface was 1.2 µm, and the lengthwise F5 value was 52 MPa.

This film was deposited at the same condition as that in Example 7, and thereafter, it was slit at a width of 100 mm and a length of 4,800 m to prepare 48 reels.

Combining this T-type margin product and a usual margin product, 100 capacitor elements were made, and the generation rates of wrinkle and shift were investigated. The generation rate of wrinkle was 1%, and the generation rate of shift was 4%.

Further, by the time reaching 50% in capacity change rate, the number of elements broken was 0, and the application time was 134 hours.

Example 11

A polypropylene film was prepared at the same conditions as those of Example 7 other than a condition of cooling and solidifying a sheet delivered out from a T die with a slit by a cooling roll with a temperature of 91° C., and thereafter, stretching the film in the longitudinal direction at a temperature of 138° C. and a draw ratio of 5 times.

At that time, the MMV of the film was 3.2 µm, the Δd was 0.19 µm, the ten-point average roughness Rz of the surface applied with the corona discharge treatment was 0.7 µm, the ten-point average roughness Rz of the opposite surface was 0.8 µm, and the lengthwise F5 value was 55 MPa.

This film was deposited at the same condition as that in Example 7, and thereafter, it was slit at a width of 100 mm and a length of 4,800 m to prepare 48 reels.

Combining this T-type margin product and a usual margin product, 100 capacitor elements were made, and the generation rates of wrinkle and shift were investigated. The generation rate of wrinkle was 3%, and the generation rate of shift was 1%.

Further, by the time reaching 50% in capacity change rate, the number of elements broken was 1, and the application time was 188 hours.

Example 12

A polypropylene film was prepared at the same conditions as those of Example 7 other than a condition of cooling and solidifying a sheet delivered out from a T die with a slit by a cooling roll with a temperature of 89° C., thereafter, stretching the film in the longitudinal direction at a temperature of 136° C. and a draw ratio of 5 times, then, stretching the film in the transverse direction at a temperature of 165° C. and a draw ratio of 10 times, and then, heat treating the film at a temperature of 160° C.

At that time, the MMV of the film was 3.2 µm, the Δd was 0.18 µm, the ten-point average roughness Rz of the surface applied with the corona discharge treatment was 0.8 µm, the ten-point average roughness Rz of the opposite surface was 0.8 µm, and the lengthwise F5 value was 55 MPa.

This film was deposited at the same condition as that in Example 7, and thereafter, it was slit at a width of 100 mm and a length of 4,800 m to prepare 48 reels.

Combining this T-type margin product and a usual margin product, 100 capacitor elements were made, and the generation rates of wrinkle and shift were investigated. The generation rate of wrinkle was 0%, and the generation rate of shift was 0%.

Further, by the time reaching 50% in capacity change rate, the number of elements broken was 1, and the application time was 227 hours.

Comparative Example 4

A polypropylene film was prepared at the same conditions as those of Example 7 other than a condition of cooling and solidifying a sheet delivered out from a T die with a slit by a cooling roll with a temperature of 83° C.

At that time, the MMV of the film was 3.2 µm, the Δd was 0.07 µm, the ten-point average roughness Rz of the surface applied with the corona discharge treatment was 0.5 µm, the ten-point average roughness Rz of the opposite surface was 0.6 µm, and the lengthwise F5 value was 52 MPa.

This film was deposited at the same condition as that in Example 7, and thereafter, it was slit at a width of 100 mm and a length of 4,800 m to prepare 48 reels.

Combining this T-type margin product and a usual margin product, 100 capacitor elements were made, and the generation rates of wrinkle and shift were investigated. The generation rate of wrinkle was 7%, and the generation rate of shift was 0%.

Further, by the time reaching 50% in capacity change rate, the number of elements broken was 6, and the application time was 206 hours.

Comparative Example 5

A polypropylene film was prepared at the same conditions as those of Example 7 other than a condition of cooling and solidifying a sheet delivered out from a T die with a slit by a cooling roll with a temperature of 97° C., and thereafter, stretching the film in the longitudinal direction at a temperature of 142° C. and a draw ratio of 5 times.

At that time, the MMV of the film was 3.3 µm, the Δd was 0.35 µm, the ten-point average roughness Rz of the surface applied with the corona discharge treatment was 1.5 µm, the ten-point average roughness Rz of the opposite surface was 1.6 µm, and the lengthwise F5 value was 51 MPa.

This film was deposited at the same condition as that in Example 7, and thereafter, it was slit at a width of 100 mm and a length of 4,800 m to prepare 48 reels.

Combining this T-type margin product and a usual margin product, 100 capacitor elements were made, and the generation rates of wrinkle and shift were investigated. The generation rate of wrinkle was 1%, and the generation rate of shift was 10%.

Further, by the time reaching 50% in capacity change rate, the number of elements broken was 2, and the application time was 71 hours.

Comparative Example 6

A polypropylene film was prepared at the same conditions as those of Example 7 other than a condition of supplying a polypropylene resin with a melt index of 4.1 g/10 min. and a melting point of 165° C. to an extruder with a temperature of 230° C., melting it, and delivering it out from a T die with a slit in a form of a sheet.

At that time, the MMV of the film was 3.2 μm, the Δd was 0.20 μm, the ten-point average roughness Rz of the surface applied with the corona discharge treatment was 1.0 μm, the ten-point average roughness Rz of the opposite surface was 1.1 μm, and the lengthwise F5 value was 45 MPa.

This film was deposited at the same condition as that in Example 7, and thereafter, it was slit at a width of 100 mm and a length of 4,800 m to prepare 48 reels.

Combining this T-type margin product and a usual margin product, 100 capacitor elements were made, and the generation rates of wrinkle and shift were investigated. The generation rate of wrinkle was 11%, and the generation rate of shift was 1%.

Further, by the time reaching 50% in capacity change rate, the number of elements broken was 3, and the application time was 141 hours.

The results of the above-described Examples 1-12 and Comparative Examples 1-6 are shown in Tables 1 and 2.

TABLE 1

| | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Thickness determined by micrometer method (μm) | | 3 | 3 | 3 | 3 | 3 | 3 | 3 | 3 | 3 |
| Δd (μm) | | 0.10 | 0.11 | 0.13 | 0.06 | 0.18 | 0.09 | 0.03 | 0.21 | 0.09 |
| Shrinkage dimensional change rate (%) | Longitudinal direction | 2.7 | 2.6 | 2.5 | 2.9 | 2.7 | 3.0 | 2.8 | 2.5 | 3.4 |
| | Transverse direction | 0.3 | 0.2 | 0 | 0.5 | 0.1 | 0.7 | 0.3 | 0.1 | 0.8 |
| Rz | Treated surface (μm) | 0.4 | 0.4 | 0.5 | 0.2 | 0.6 | 0.4 | 0.2 | 0.7 | 0.4 |
| | Opposite surface (μm) | 0.7 | 0.7 | 0.8 | 0.3 | 0.9 | 0.6 | 0.3 | 1.2 | 0.6 |
| F5 value (Mpa) | | 48 | 48 | 46 | 48 | 48 | 48 | 47 | 48 | 49 |
| Wrinkle (%) | | 2 | 0 | 0 | 2 | 0 | 0 | 8 | 0 | 0 |
| Shift (%) | | 0 | 0 | 3 | 4 | 4 | 0 | 10 | 6 | 0 |
| Number of breakage (number) | | 0 | 0 | 1 | 3 | 2 | 3 | 8 | 6 | 6 |
| Number of self recovering (number) | | 2 | 2 | 5 | 2 | 4 | 3 | 7 | 9 | 5 |

TABLE 2

| | | Example 7 | Example 8 | Example 9 | Example 10 | Example 11 | Example 12 | Comparative Example 4 | Comparative Example 5 | Comparative Example 6 |
|---|---|---|---|---|---|---|---|---|---|---|
| Thickness determined by micrometer method (μm) | | 3.3 | 3.2 | 3.2 | 3.3 | 3.2 | 3.2 | 3.2 | 3.3 | 3.2 |
| Δd (μm) | | 0.20 | 0.19 | 0.12 | 0.27 | 0.19 | 0.18 | 0.07 | 0.35 | 0.20 |
| F5 value (Mpa) | | 52 | 57 | 53 | 52 | 55 | 55 | 52 | 51 | 45 |
| Rz | Treated surface (μm) | 1.0 | 1.0 | 0.8 | 1.2 | 0.7 | 0.8 | 0.5 | 1.5 | 1.0 |
| | Opposite surface (μm) | 1.1 | 1.0 | 0.9 | 1.2 | 0.8 | 0.8 | 0.6 | 1.6 | 1.1 |
| Shrinkage dimensional change rate (%) | Longitudinal direction | 3.3 | 3.5 | 3.4 | 3.2 | 3.5 | 2.7 | 3.3 | 3.4 | 3.2 |
| | Transverse direction | 0.3 | 0.6 | 0.4 | 0.5 | 0.5 | 0.2 | 0.6 | 0.4 | 0.2 |
| Wrinkle (%) | | 2 | 0 | 4 | 1 | 3 | 0 | 7 | 1 | 11 |
| Shift (%) | | 1 | 0 | 0 | 4 | 1 | 0 | 0 | 10 | 1 |
| Number of breakage (number) | | 0 | 0 | 2 | 0 | 1 | 1 | 6 | 2 | 3 |
| Average application time (hours) | | 173 | 212 | 235 | 134 | 188 | 227 | 206 | 71 | 141 |

As understood from Tables 1 and 2, generation of wrinkles and shift can be suppressed in the capacitor element winding process and the following press process, and a polypropylene film for a flat type capacitor, which has good withstand voltage characteristics, in particular, which is excellent in self-recovering property, which is small-sized and has a large-capacity, and which is suitable for use under a high rated voltage, can be obtained.

INDUSTRIAL APPLICATIONS

The flat type capacitor-use polypropylene film and the flat type capacitor using it are particularly suitable to a flat type capacitor aiming a small size and a large-capacity and use under a high rated voltage.

The invention claimed is:

1. A flat type capacitor-use polypropylene film comprising a resin with a melting point of 164 to 167° C. and having 1) a Δd, which is a difference between a thickness of said film determined by micrometer method and a thickness of said film determined by weighing method, of 0.1-0.3μm and 2) a lengthwise F5 value of 50 MPa or more, wherein the thickness of the film determined by the micrometer method is 4μm or less.

2. The flat type capacitor-use polypropylene film according to claim 1, wherein at least one surface of the film has a ten-point average surface roughness Rz of 0.7-1.4μm.

3. A flat type capacitor-use metallized polypropylene film, comprising a metal deposited on one or both surfaces of the flat type capacitor-use polypropylene film according to claim 1.

4. The flat type capacitor-use metallized polypropylene film according to claim 3, wherein at least a part of margins of a metal deposition pattern is a margin which is not parallel to a longitudinal direction of said film.

5. A flat type capacitor comprising the flat type capacitor-use metallized polypropylene film according to claim 3 as at least a part thereof.

6. A flat type capacitor comprising the flat type capacitor-use polypropylene film according to claim 1 as at least a part thereof.

* * * * *

UNITED STATES PATENT AND TRADEMARK OFFICE
CERTIFICATE OF CORRECTION

PATENT NO. : 7,405,920 B2 Page 1 of 1
APPLICATION NO. : 10/548820
DATED : July 29, 2008
INVENTOR(S) : Uematsu et al.

It is certified that error appears in the above-identified patent and that said Letters Patent is hereby corrected as shown below:

On the Title Page:

At Item [57], in line 2 of the Abstract, please change "Ad" to -- $\Delta d$ --.

Signed and Sealed this

Tenth Day of March, 2009

JOHN DOLL
*Acting Director of the United States Patent and Trademark Office*